(12) United States Patent
Sun et al.

(10) Patent No.: US 10,564,512 B2
(45) Date of Patent: Feb. 18, 2020

(54) HYBRID PHOTONIC NON-BLOCKING WIDE SPECTRUM WDM ON-CHIP ROUTER

(71) Applicant: The George Washington University, Washington, DC (US)

(72) Inventors: Shuai Sun, Arlington, VA (US); Volker J. Sorger, Alexandria, VA (US); Tarek El-Ghazawi, Vienna, VA (US); Vikram K. Narayana, Ashburn, VA (US)

(73) Assignee: The George Washington University, Washington, DC (US)

( * ) Notice: Subject to any disclaimer, the term of this patent is extended or adjusted under 35 U.S.C. 154(b) by 12 days.

(21) Appl. No.: 15/888,862

(22) Filed: Feb. 5, 2018

(65) Prior Publication Data
US 2018/0246391 A1 Aug. 30, 2018

Related U.S. Application Data

(60) Provisional application No. 62/454,208, filed on Feb. 3, 2017.

(51) Int. Cl.
*G02F 1/313* (2006.01)
*H04Q 11/00* (2006.01)
*G02F 1/31* (2006.01)

(52) U.S. Cl.
CPC ....... *G02F 1/3132* (2013.01); *H04Q 11/0005* (2013.01); *G02F 2001/311* (2013.01);
(Continued)

(58) Field of Classification Search
None
See application file for complete search history.

(56) References Cited

U.S. PATENT DOCUMENTS

| 9,008,513 B2 | 4/2015 | Kim et al. | |
| 2002/0154852 A1* | 10/2002 | Levine | G02F 1/0553 385/16 |
| 2015/0234138 A1* | 8/2015 | Sorger | G02B 6/3596 385/16 |

OTHER PUBLICATIONS

David A. B. Miller; "Attojoule Optoelectronics for Low-Energy Information Processing and Communications"; Journal of Lightwave Technology, vol. 35, No. 3, Feb. 1, 2017; pp. 346-396.
(Continued)

*Primary Examiner* — Chad H Smith
(74) *Attorney, Agent, or Firm* — Blank Rome LLP

(57) ABSTRACT

Photonic data routing in optical networks is expected overcome the limitations of electronic routers with respect to data rate, latency, and energy consumption. However photonics-based routers suffer from dynamic power consumption, and non-simultaneous usage of multiple wavelength channels when microrings are deployed and are sizable in footprint. Here we show a design for the first hybrid photonic-plasmonic, non-blocking, broadband 5×5 router based on 3-waveguide silicon photonic-plasmonic 2×2 switches. The compactness of the router (footprint <200 μm²) results in a short optical propagation delay (0.4 ps) enabling high data capacity up to 2 Tbps. The router has an average energy consumption ranging from 0.1~1.0 fJ/bit depending on either DWDM or CDWM operation, enabled by the low electrical capacitance of the switch. The total average routing insertion loss of 2.5 dB is supported via an optical mode hybridization deployed inside the 2×2 switches, which minimizes the coupling losses between the photonic and plasmonic sections of the router. The router's spectral bandwidth resides in the S, C and L bands and exceeds 100 nm supporting WDM applications since no resonance feature are required. Moreover, this hybrid photonic-plasmonic switch design is also suitable for 3 up to a few dozens of
(Continued)

routing ports by simply cascading our 2×2 switch with a specific pattern. Taken together this novel optical router combines multiple design features, all required in next generation high data-throughput optical networks and computing systems.

15 Claims, 6 Drawing Sheets

(52) U.S. Cl.
CPC ............... *H04Q 2011/0007* (2013.01); *H04Q 2011/0039* (2013.01); *H04Q 2011/0041* (2013.01)

(56) References Cited

OTHER PUBLICATIONS

Esmaeilzadeh, et al. "Power Challenges May End the Multicore Era"; Communications of the ACM; vol. 56, No. 2, Feb. 2013; pp. 93-102.
Henkel,et al. "New Trends in Dark Silicon"; Chair for Embedded Systems (CES), Karlsruhe Institute of Technology (KIT), Karlsruhe, Germany E-mail: {henkel, heba.khdr, pagani, muhammad. shafique}@kit.edu; 2015; 6 pages.
Govid P. Agrawal; "Fiber-Optic Communication Systems" Inst. of Optics; Univ. of Rochester; 2002; pp. 1-66.
Narayana, et al., "MorphoNoC: Exploring the Design Space of a Configurable Hybrid NoC using Nanophotonics"; The George Washington Univ.,Dept. of Electrical and Computer Engineering, : New Mexico State Univ. Klipsch School of Electrial and Computer Engineering; © 2017; pp. 1-14.
Ji, et al., "Five-Port Optical Router Based on Microring Switches for Photonic Networks-on-Chip"; IEEE Photonic Technology Letters, vol. 25, No. 5, Mar. 1, 2013; pp. 492-495.
Zhao, et al., "5-port optical router based on Si microring optical switches for photonic networks-on-chip"; Research Gate, IEEE Photonics Technology Letters; vol. 28, No. 9, May 1, 2016; pp. 947-950.
David A. B. Miller, "Device Requirements for Optical Interconnects to Silicon Chips"; Proceedings of the IEEE, vol. 97, No. 7, Jul. 2009, pp. 1166-1185.
Hamedani, et al., "QuT: A Low-Power Optical Network-on-Chip", Natural Sciences and Engineering Research Council of Canada and the University of Toronto; 2014; 8 pgs.
Liu, et al. "Fundamental Scaling Laws in Nanophotonics", Scientific Reports 6:37419 | DOI: 10.1038/srep 37419; 2016; pp. 1-13.
Sun, et al., "DSENT—A Tool Connecting Emerging Photonics with Electronics for Opto-Electronic Networks-on-Chip Modeling", Dept. of Electrical Engineering and Computer Science; Massachusetts Institute of Technology, Cambridge, MA; 2012; 10 pages.
Wassel et al., "Opportunities and Challenges of Using Plasmonic Components in Nanophotonic Architectures", IEEE Journal of Emerging and Selected Topics in Circuits and Systems, vol. 2, No. 2, Jun. 2012, pp. 154-168.
Treyz et al. "Silicon Mach-Zehnder waveguide interferometers based on the plasma dispersion effect"; Appl. Phys. Lett. 59, 771 (1991); doi: 10.1063/1.105338, 4 pgs.
Li, et al., "Mach-Zehnder-based five-port silicon router for optical interconnects", Optics Letters, vol. 38, No. 10, May 15, 2013, pp. 1703-1705.
Ye, et al., "$\lambda$-Size ITO and Graphene-Based Electro-Optic Modulators on SOI", IEEE Journal of Selected Topics in Quantum Electronics, vol. 20, No. 4, Jul./Aug. 2014; 10 pgs.
Pickus, et al. Silicon Plasmon Modulators: Breaking Photonic Limits, IEEE Photonics Society Newsletter, Dec. 2013, pp. 4-10.
Huang, et al. A Sub (REF. 18) Size Modulator Beyond the Efficiency-Loss Limit; IEEE Photonics Journal, vol. 5, No. 4, Aug. 4, 2013, 12 pgs.
Ma, et al. Indium-Tin-Oxide for High-performance Electro-optic Modulation, Nanophotonics 2015; 4:198-213.
Liu et al. Integrated Nanocavity Plasmon Light Sources for On-Chip Optical Inter Connects, ACS Photonics, American Chemical Society, 2016, vol. 3, pp. 233-242.
Ye, et al. A compact plasmonic MOS-based 2×2 electro-optic switch, DE Gruyter Open, 2015, 8 pages.
Ma et. Two-Dimensional Material-Based Mode Confinement Engineering in Electro-Optic Modulators, IEEE Journal of Selected Topics in Quantum Electronics, vol. 23, No. 1, Jan./Feb. 2017, 8 pgs.
Tahersima et al. Enhanced photon absorption in spiral nanostructured solar cells using layered 2D materials, Nanotechnology 26 (2015), 344005 (7pp).
Li et al Monolithic III-V on Silicon Plasmonic Nanolaser Structure for Optical Interconnects, Scientific Reports, 5:14067; DOI:10.1038/srep14067, Sep. 2015; pp. 1-9.
Liu et al Electrically-driven carbon nanotube-based plasmonic laser on silicon, Optical Materials Express, vol. 5, No. 9, Sep. 1, 2015, 242736 10pgs.
Zhao, et al. "Broadband Electroabsorption Modulators Design Based on Epsilon-Near-Zero Indium Tin Oxide"; IEEE Journal of Selected Topics in Quantum Electronics, vol. 21, No. 4, Jul./Aug. 2015 3300207, 7 pgs.
Sun et al. "The Case for Hybrid Photonic Plasmonic Interconnects (HyPPIs): Low-Latency Energy-and-Area-Efficient on-Chip Interconnects" IEEE Photonics Journal vol. 7, No. 6, Dec. 2015 (4801614); 15 pgs.
Sun et al. "A Universal Multi-Hierarchy Figure-of-Merit for On-Chip Computing and Communications" Department of Electrical and Computer Engineering, GWU, 2016, pp. 1-10.
Narayana, et al. "HyPPI NoC: Bringing Hybrid Plasmaonics to an Opto-Electronic Network-on-Chip" IEEE Computer Society, 2017 46th International Conference on Parallel Processing, p. 131-140.
Mehrabian, et al. "D3Noc: Dynamic Data-Driven Network on Chip in Photonic Electronic Hybrids" arXiv:1708.06721v1 [cs.OH] Aug. 22, 2017 (8pgs).
Oulton, et al. A hybrid plasmonic waveguide for subwavelength confinement and long-range propagation, nature photonics, vol. 2, Aug. 2008, pp. 496-500.
Amin et al., "A deterministic guide for material and mode dependence of on-chip electro-optic modulator performance", Solid-State Electronics, 2017, http://dx.doi.org/10.1016/j.sse.2017.06.024, pp. 1-10.
E Brion, et al. "Adiabatic elimination in a lambda system"; J. Phys. A: Math. Theor. 40 (2007) 1033-1043.
Mrejen et al. "Adiabatic elimination-based coupling control in densely packed subwavelength waveguides" Nature Communications, 6:7565, DOI:10.1038/ncomms8565 (2015) pp. 1-7.
Donnelly, et. al. "Symmetric Three-Guide Optical Coupler with Nonidentical Center and Outside Guides", IEEE Journal of Quantum Electronics, vol. QE-23, No. 4, Apr. 1987, p. 401-406.
R.A. Soref, "Properties of the terminated optical crossbar matrix"; Applied Optics, vol. 15, No. 12, Dec. 1976, 2 pgs.
Richard Soref, "Mid-infrared 2×2 electro-optical switching by silicon and germanium three-waveguide and four-waveguide directional couplers using free-carrier injection", Photon. Res./ vol. 2, No. 5, Oct. 2014, pp. 102-110).
Howard Frazier, "The 802.3z Gigabit Ethernet Standard" IEEE 802 Perspectives, May/Jun. 1998, p. 6-7.
Shannon et al. "The Mathematical Theory of Communication", The University of Illinois Press, Urbana, 1964, pp. 1-131.
Sun et al. "Single-chip microprocessor that communicates directly using light", Nature, 528(7583), 2015, pp. 1-29.
Yaghoubi, et al. "Five-Port Optical Router Design Based on Mach-Zehnder Switches for Photonic Networks-on-Chip", Journal of Advances in Computer Research, (vol. 7, No. 3, Aug. 2016), pp. 47-53.
Dang, et al. "Mode-Division-Multiplexed Photonic Router for High Performance Network-on-Chip", 2015 28th International Confer-

(56) References Cited

OTHER PUBLICATIONS ence on VLSI Design and 2015 14th International Conference on Embedded Systems, pp. 1-6.

* cited by examiner

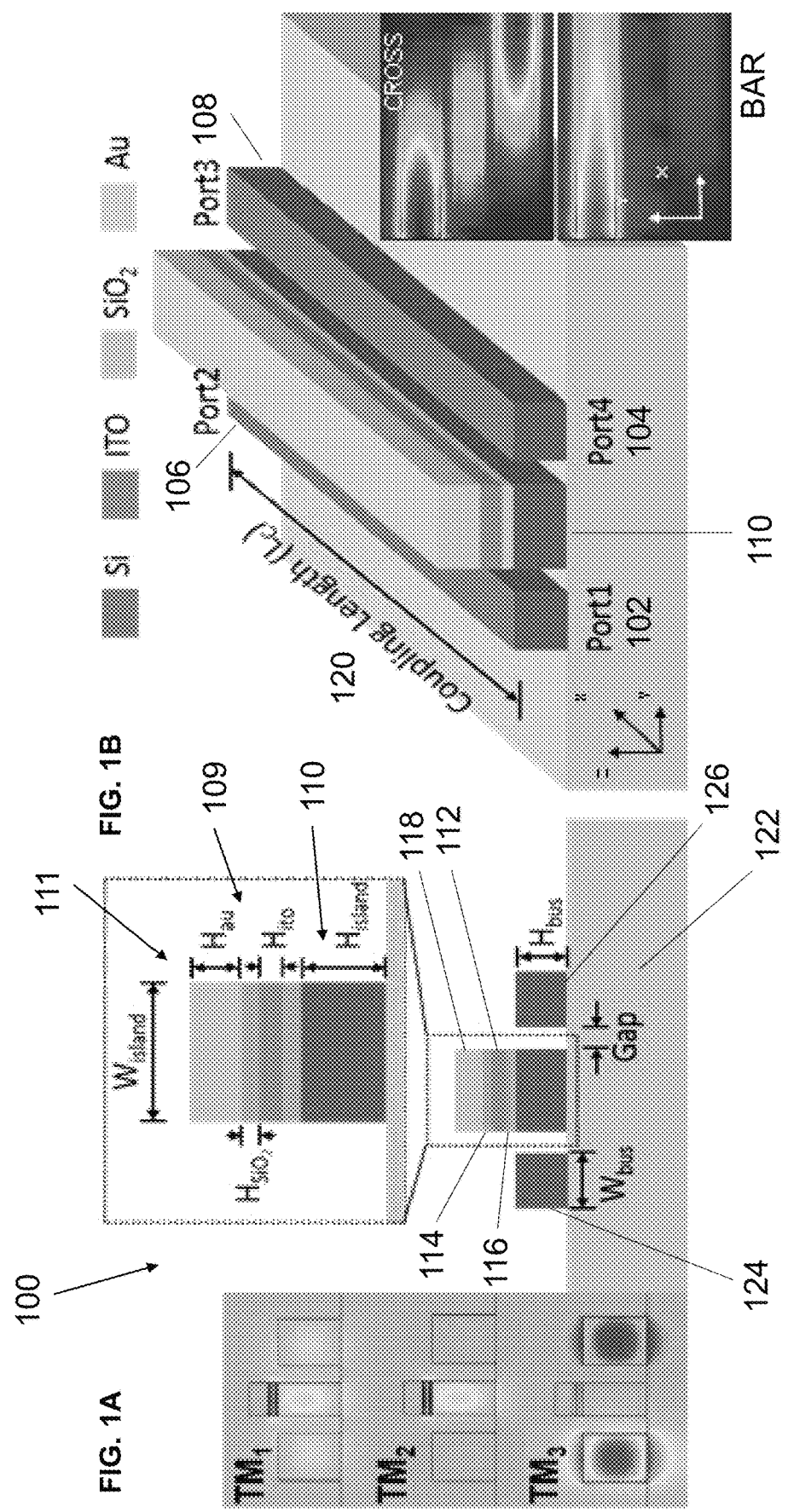

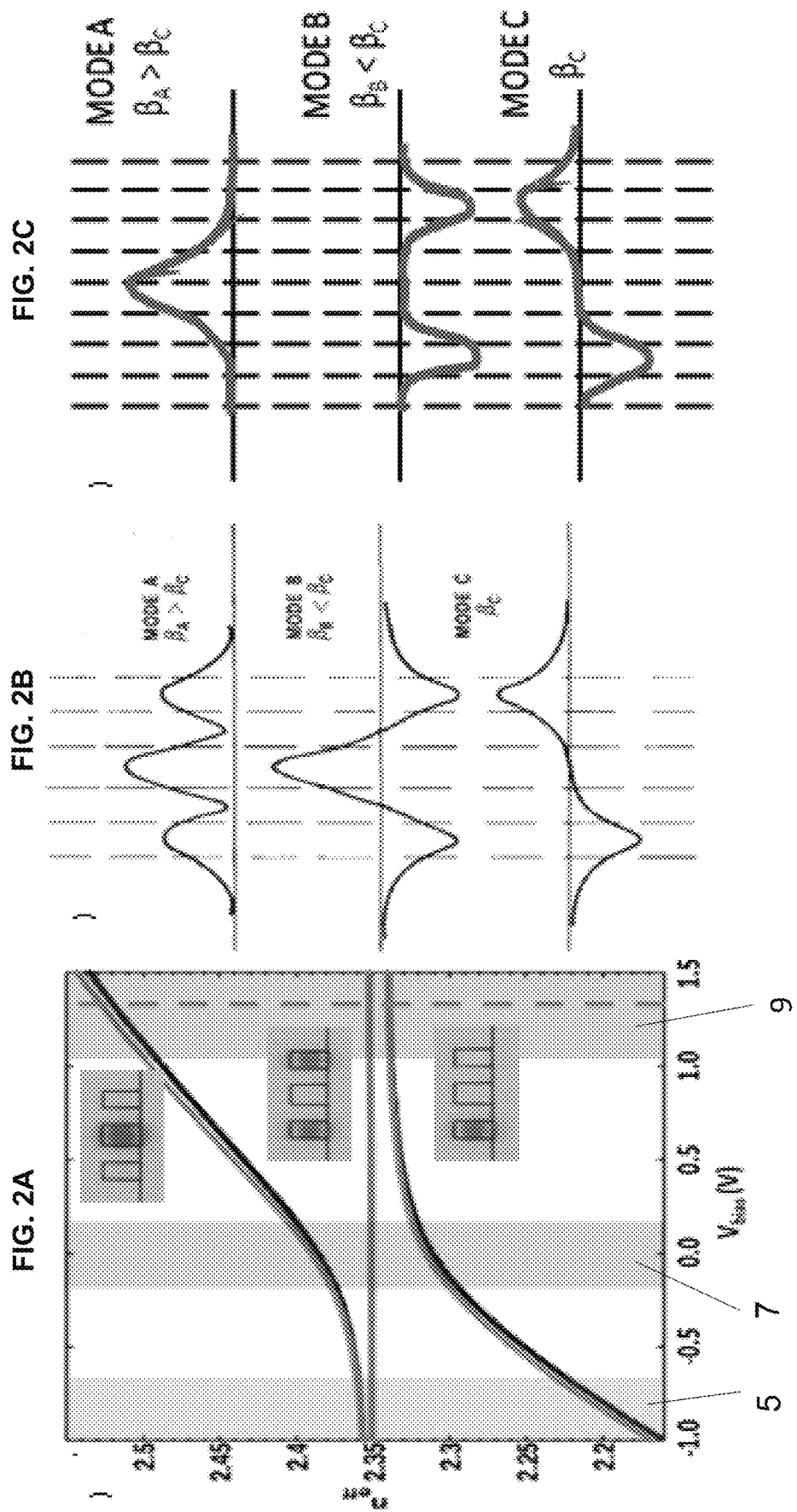

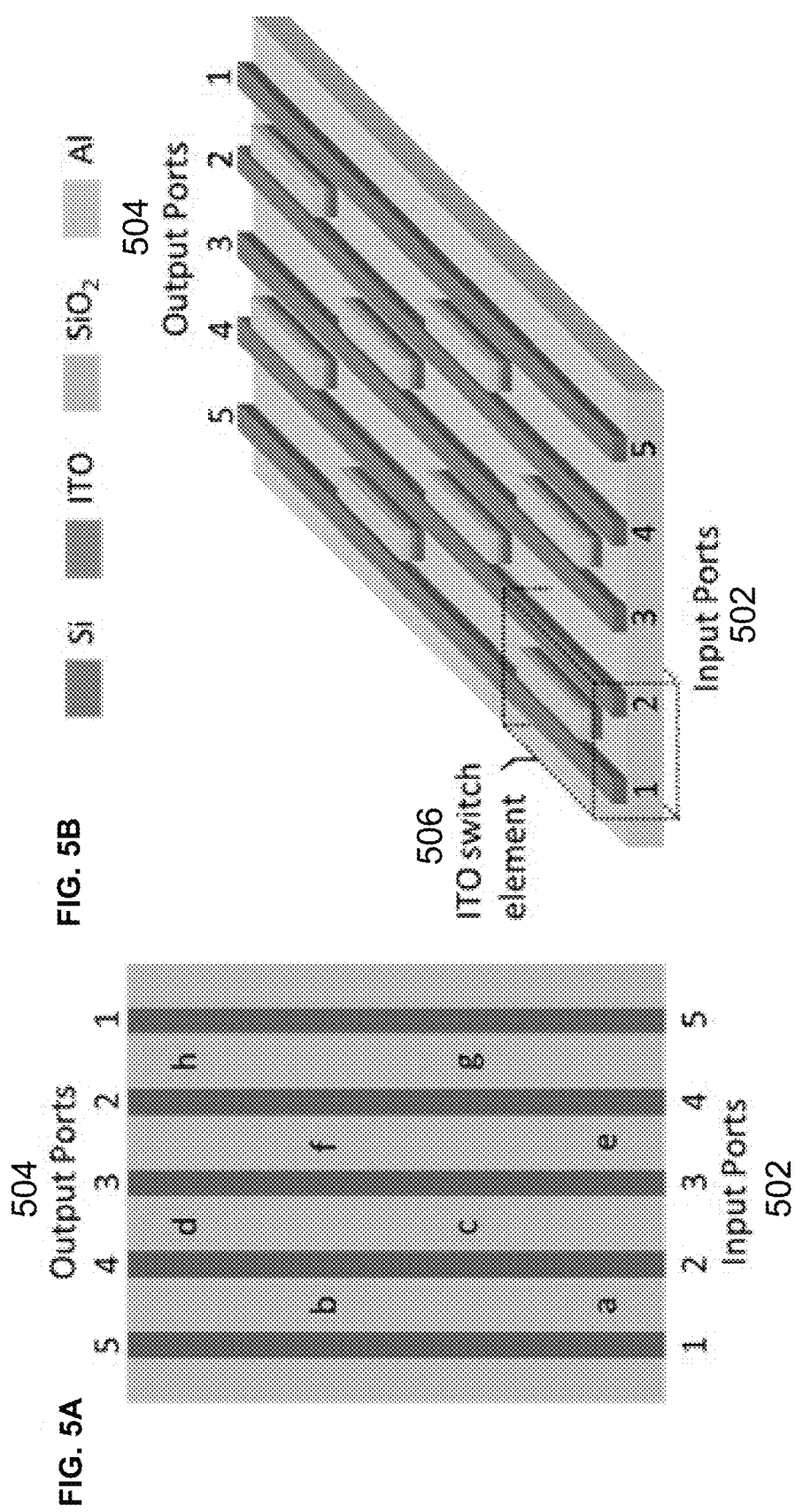

US 10,564,512 B2

HYBRID PHOTONIC NON-BLOCKING WIDE SPECTRUM WDM ON-CHIP ROUTER

RELATED APPLICATIONS

This application claims the benefit of U.S. Provisional Application No. 62/454,208, filed Feb. 3, 2017, the entire contents of which are incorporated herein by reference.

GOVERNMENT LICENSE RIGHTS

This invention was made with government support under the Air Force Office of Scientific Research (AFOSR) award number FA9550-15-1-0447 which is part of the Dynamic Data-Driven Applications System (DDDAS) program, and by AFOSR award number FA9550-14-1-0378, and by AFOSR award number FA9550-17-P-0014 of the small business innovation research (SBIR) program. The government has certain rights in the invention.

BACKGROUND OF THE INVENTION

Field of the Invention

The present invention relates to a silicon-based, broadband waveguide-integrated electro-optical switch for performing optical switching. More particularly, the present invention relates to an electro-optical switch for optically coupling and decoupling silicon-based waveguides.

Background of the Related Art

The demand for higher data communication capabilities continues to rise, spanning from long haul-down to board, and even the chip level [1]. Accelerating factors beyond developments in software applications are demands for higher data capabilities in hardware implementation. However, physical limitations such as power and thermal budget constraints appose these demands restricted by technology densification as seen in multicore technology and simple I/O capacity [2]. The latter imposes restrictions on the electronic chips, known as 'dark silicon' [3]. With the bosonic nature of photons lacking a photon-photon force, data parallelism is fundamental in optics and is routinely utilized in optical data communication such as wavelength division multiplexing (WDM) [4].

With the success of long-haul optical networks, optical interconnects at the board, and even at the chip-level, have become of interest in order to mitigate the processing-to-communication gap [5]. However, the majority of optical network-on-chip (NoC) routers perform their role not exclusively in the photonic domain but often in capacitive-limiting electronics. The later also requires an overhead-heavy optic-electric-optic (O-E-O) conversion. On the other hand, one can perform routing entirely in the electronics. Yet, the known performance bottlenecks of electronic devices, namely mainly delay and power dissipation, and clamping performance.

Turning to optical routing, on the other hand, is in itself inefficient given the current photonics technology due to the low light-matter interaction (LMI), and weak electro-optic modulation in silicon [6]. While photonic routers based on microring resonators have been proposed [7] and demonstrated [8], the high sensitivity (i.e. spectral and amplitude) require dynamic tunability which is both power hungry and relatively slow if high Q-factor rings are used. Hence taken together, optical routing is a) technologically cumbersome, b) latency- and energy-prone mainly due to O-E-O conversion, and c) suffers from high energy overhead due to signal error correction at the detectors TIA and laser stages, and from thermal tuning in rings-based routers [9-13].

SUMMARY OF THE INVENTION

To address these and other deficiencies in the art, disclosed herein is an optical router design using a hybrid plasmonic-photon approach and emerging unity-high index tuning materials simultaneously to improve photonic integrated routing performance in all three factors. The enabling technological insights are based on the strong index tunability of the underlying optical plasmonic hybrid mode enabling short 2×2 switches based on voltage-controlled directional-couplers. Cascading a network of these plasmonic 2×2 switches can be used to design a compact optical router since the switching length scales inversely with index-change per voltage. In addition, given that the 2×2 switches are non-resonant devices due to the lossy plasmonic mode, this optical router allows for spectrally broadband operation for WDM applicability. Furthermore, unlike microrings, thermal tuning is not required, thus saving energy consumption. This hybrid photonic-plasmonic router can be synergistically deployed in Silicon-based network topology improving system performance. The terminology 'all-optical router' is used herein to describe the lack-of O-E-O conversion inside the router, but note that signal routing still requires electrical decision-making from the control circuit.

The invention disclosed herein also offers: 1) design optimization and the operating principles of the photonic-plasmonic hybrid 2×2 switch using indium tin oxide (ITO) as the active index modulation material. These switches are the building blocks of the router; 2) 5×5 optical router design and related operating strategies; 3) router performance and benchmarking against existing designs; and 4) general scaling pattern for this double biased hybrid photonic-plasmonic broadband switch based non-blocking optical routing design.

These and other objects of the invention, as well as many of the intended advantages thereof, will become more readily apparent when reference is made to the following description, taken in conjunction with the accompanying drawings.

BRIEF DESCRIPTION OF THE FIGURES

FIGS. 1A and 1B show a schematic design of the 2×2 hybrid photonic-plasmonic switch using ITO as the active material. The coupling length of the switch is equal to the CROSS state coupling length $L_C$. More specifically, FIG. 1A shows the $TM_1$, $TM_2$ and $TM_3$ supermodes of the 2×2 ITO switch. FIG. 1B shows the electric filed results of the device at BAR and CROSS states at 1550 nm wavelength. The length of the ITO switch (8.9 µm) in the x-direction is not to scale and λ=1550 nm.

FIGS. 2A through 2C show a mode index of three-waveguide directional coupler system with three operating regions. More specifically, FIG. 2A shows effective index mapping by changing bias voltage on the switching island. The green, blue and the red areas represent the decouple region, critical coupling region and the AE region respectively. FIG. 2B shows the three low-order modes at the critical coupling region. FIG. 2C shows the same three low-order modes at the AE region.

FIG. 3A shows the top view of the FDTD simulation result at the OFF state. FIG. 3B shows the top view of the FDTD simulation result at the ON state. FIG. 3C shows the mode index mapping of the Bar state (bypassing state). d) Mode index mapping of the Cross state (critical coupling state).

FIG. 4A shows a switching island width and gap sweep for power transmission efficiency optimization. FIG. 4B shows a switching island height sweep for CROSSBAR state insertion loss and extinction ratio trade-off. FIG. 4C shows the ITO carrier concentrations used for the CROSS and the BAR states simulation are assumed to be $10^{19}$ cm$^{-3}$ and $6.8\times10^{20}$ cm$^{-3}$, respectively with the refractive indices 1.960+i0.002 and 0.471+i0.643 calculated based on the Drude model in a) and b) where $\lambda$=1550 nm.

FIGS. 5A and 5B show the top view and the schematic plot of the 5×5 Port non-blocking optical router. 8 individual 2×2 ITO switches are placed with certain pattern in order to achieve non-blocking routing function. The length of the ITO switches are not to scale.

FIG. 6B shows five-wavelength-five-input with each input port assigned to a wavelength for WDM testing with 0.8 nm wavelength spacing.

DETAILED DESCRIPTION OF THE PREFERRED EMBODIMENTS

Figures 3A, 3B, 3C, 3D:
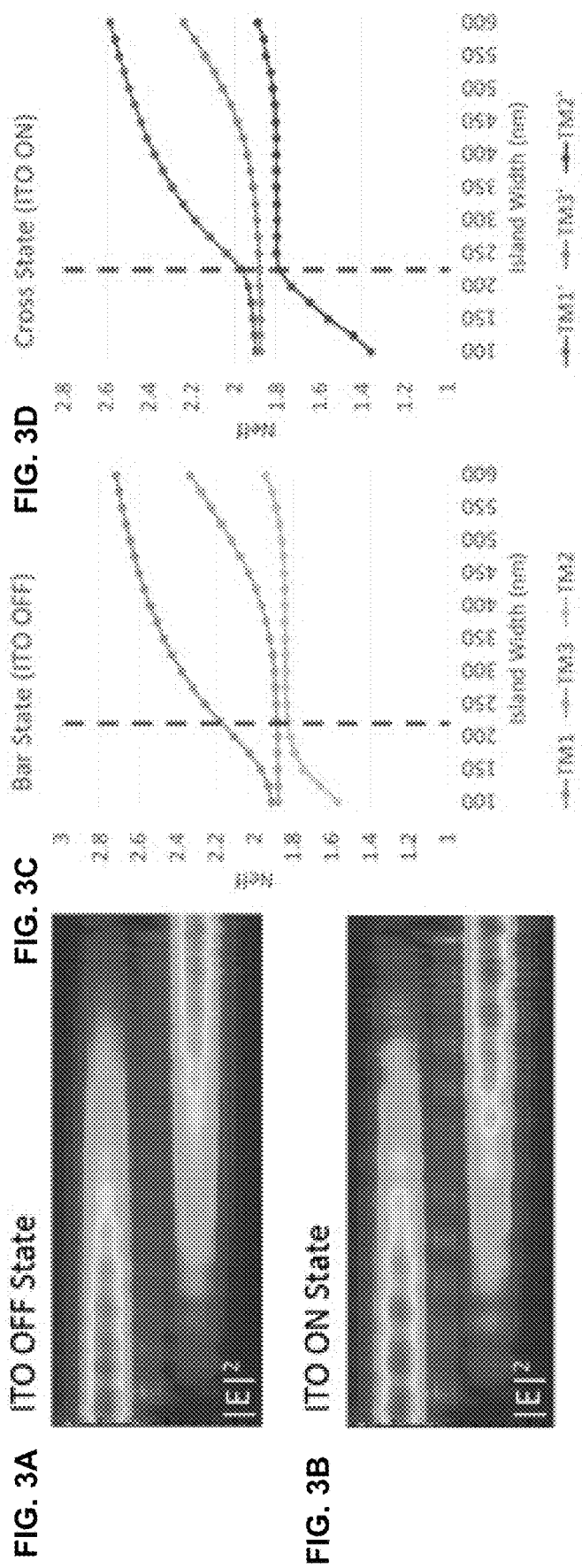
FIGS. 3A through 3D show an exemplary ITO-based three-waveguide AE coupler. More specifically.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

The present invention is a hybrid photonic-plasmonic broadband switch design. One illustrative non-limiting embodiment of the invention is shown in the figures and described below.

Technology Hybridization

The fundamental building block of the optical router is a 2×2 optical switch, namely a voltage-controlled directional coupler whose performance directly impacts the overall performance of the router. Photonic 2×2 switches with microring resonators (MRRs) or Mach-Zehnder Interferometers (MZIs) have been applied to perform this routing function since their spectral resonance is controlled by a voltage that changes the modal index of the ring, for instance, using the plasma dispersion effect in silicon [14, 15].

As such, the photonic MRR-based switch provides high spectral sensitivity (<5 nm free spectral range) and low insertion loss (<1 dB per ring). However, in order to increase the quality (Q) factor, which reduces the required ring-tuning (dynamic) power, a 10 μm or even larger ring radius may be needed, which limits packaging density, and demands reasonably high power consumption during thermal tuning [7, 8]. The actual required real-estate on-chip is effectively even larger than the physical device since the electrical thermal heating pads require not only physical space but introduce thermal stray fields that need to be spread. In addition, the thermal ring response time is typically on the order of microseconds to nanoseconds, thus introducing long setup time for tuning the ring resonance [8].

To overcome the aforementioned fundamental and practical drawbacks, routing switches utilizing emerging materials beyond silicon, such as ITO, has been studied and carrier-based Drude tail modulation demonstrated [16-21]. In addition, polaritonic (matter-like') optical modes can increase the length-scale matching between the optical-dipole moments of the gate-controlled switching materials and the optical field of the waveguide mode such as found in plasmonics [22-24]; that is, the effective group index is increased of these modes allowing for a stronger light-matter-interaction [25-27]. Incorporating those changes in the directional-coupler-based 2×2 switch enables power- and footprint-efficient switches in the following ways; the lack of a long photon-lifetime (lossy cavity and low-Q), and short carrier drift distances (~5 nm) in the index-tuning accumulation-layer inside the index-modulating ITO layer enable allow for short time responses.

While a physical demonstration of the actual index tuning speed-potential in ITO is still outstanding, it is estimated that the carrier drift time to be sub-ps given a mobility of 15 cm$^2$/Vs for 10-20 nm thin ITO films [25]. This estimation does not violate physical fundamentals, as the corresponding drift velocity is about a third of ITOs Fermi-velocity. However, based on previous ITO experimental result in ref [25], the observed index change was an averaged value for an ITO thickness of 10 nm; meaning the actual index change is higher at near the interface, and lower further away from it [19]. That is, the thickness of the ITO layer (20 nm) is doubled while biasing it simultaneously from both the top and the bottom with opposite-sign voltages to achieve two accumulation layers at each ITO-insulator surface, which is beneficial for reducing the physical switch length thus enhancing the coupling efficiency discussed below. The selection for ITO as the switching material is based on its unity-strong index tunability and possible CMOS compatibility [28].

The actual index of the ITO film was previously determined to be non-homogeneous, which was explored in the past [19]. Here, experimentally-proven averaged data from ref [25] which were based on 10 nm thick ITO films is used. Taken together, the anticipated advantages of the 2×2 plasmonic-photonic switch are therefore a) compact physical scale, b) fast response times and short carrier drift distances to form an accumulation mode in the capacitively-gated ITO-film, and c) being spectrally broadband. While we provide a detailed loss-analysis further below for the entire 2×2 switch-based optical router, we here note that the intrinsic Ohmic plasmonic losses are actually not a detrimental factor; this is because the router is comprised of a combination of silicon photonics, namely SOI (low-loss), and plasmonics segments (high-loss), whereas the plasmonic parts are just a few micrometers in length each, thus forming a hybrid-plasmon-photon integration scheme shown in ref [29]. In fact, we find that the effective loss through this hybrid router is comparable to that through a similar-length network of silicon-based MRRs, whilst this hybrid router shows improvements in voltage, delay, and footprint and has great potentials in optical networks and even electrical-optical hybrid networks [6, 30-32].

Switch Structure

Turning to FIGS. 1A, 1B, an HPP switch 100 is shown in accordance with one embodiment of the invention. The HPP switch 100 has a SiO$_2$ block as the substrate 122. Three elongated silicon waveguides 110, 124, 126 are placed in parallel to each other and are separated by equal spaces or gap of 150 nm. The left and right outer waveguides 124, 126 are bus waveguides. They can have any suitable shape or any suitable waveguide materials as long as it can support the operating light mode of the switch (e.g. TM mode in this embodiment) with sufficient coupling efficiency between adjacent waveguides, but in one embodiment have a square transverse cross section and a rectangular longitudinal cross section, and dimensions for example of a 400 nm width and 340 nm height.

The middle waveguide is a switch waveguide 110. The switching island 111 includes the base silicon switch waveguide 110 and switching layers 109 on top of it. The switching device has four layers 112, 114, 116, 118 on top of the switch waveguide 110. The switch waveguide 110 can have any suitable shape or any suitable waveguide materials as long as it can support the operating light mode of the switch (e.g. TM mode in this embodiment) with sufficient coupling efficiency between adjacent waveguides, though in one embodiment have a rectangular transverse cross section and a rectangular longitudinal cross section, and dimensions for example of a 275 nm width and 340 nm height. The top layers 112-118 can have any suitable shape as long as it can support the operating light mode of the switch (e.g. TM mode in this embodiment) with sufficient coupling efficiency between adjacent waveguides and the middle layer 112 can use any high index-tuning materials, though in one embodiment have the same width (of 275 nm) and length as the switch waveguide 110. In one embodiment for example, from top to bottom, the top layer 118 can have a 100 nm height and be comprised of gold, an upper or upper middle layer 114 can have a 16 nm height and be comprised of SiO$_2$, a lower or lower middle layer 112 can have a 20 nm height and be comprised of an ITO, and the bottom layer 116 can have a 16 nm height and be comprised of SiO$_2$.

All the layers 112-118 touch the adjacent layers and the SiO$_2$ bottom layer 116 touches the top of the switch waveguide 110. In one embodiment, the physical length of this switch, called the coupling length 120, is 8.9 μm. This length is for the switching island only and the bus waveguide should be no shorter than this coupling length to achieve the proper switching mechanism. In addition, all the parameters are designed for 1550 nm light source and they all vary based on different wavelength.

Fundamental Operating Principle

Hybridizing plasmonics with photonics reduces the propagation loss while keeping the advantages of the polaritonic optical mode [33]. Here, the ITO layer 112 can be regarded as the "plasmonic element" when there is a voltage applied, and the plasmonic mode will occur around the surface of the ITO layer, though perhaps the ITO layer 112 might not typically be considered to be a pure plasmonic mode since a Si waveguide is underneath it, and therefore is considered here to be a Hybrid Plasmon Polariton (HPP). When there is no voltage applied, the entire device is in photonic mode. Utilizing hybrid plasmon polaritons (HPPs), a tunable ITO layer was added within the metal-oxide-semiconductor (MOS) structure in order to form an electrical capacitor towards changing the optical mode's index via voltage control. This novel design for the switch 100 is exemplarily shown in FIG. 1A and FIG. 1B.

The switch structure includes two bus waveguides, one on each side and having an input port, shown as port 1 102 and port 4 104, and an output port of the switch, shown as port 2 106 and port 3 108. Thus, optical signals pass through the bus waveguides 124, 126, from the input ports 102, 104 to the output ports 106, 108, respectively. It is further noted that the waveguides 124, 126 are bi-directional, so that light can travel from port 102 to ports 106, 108, and from port 106 to ports 102, 104, and from port 108 to ports 102, 104, etc. They all have the same BAR and CROSS states performance since the device is symmetrical. The switch island 111 switches optical signals from the first bus waveguide 124 to the second bus waveguide 126, and vice versa from the second bus waveguide 126 to the first bus waveguide 124. The center island 111 is the actively index-tunable location of the switch. The active material 112 is "sandwiched" between an upper (or top) oxide layer 114 and a bottom oxide layer 116 structure to achieve dual bias operation. The oxide layers 114, 116 are preferably comprised of silicon dioxide. The upper oxide layer 114 of the center island 110 is preferably covered by a gold layer 118. The gold layer 118 forms a metal contact to bias the ITO layer 112 underneath. There are three layers 114, 112, 116 the metal contact 118 and the base silicon waveguide 110. This three layer design is able to bias the ITO layer 112 from both the top and the bottom, which in turn gives more index tuning in the ITO region. The top contact layer 116 and base switch waveguide 110 are biased, and the ITO 112 is grounded. That creates two electric fields to bias the ITO 112 from both sides. The bias voltage can be, for example, a 4 volts bias for an ITO 112 that is 10 nm thick.

The fundamental operation principle of this device is to use the index-tunable active layer (ITO layer) 112 to switch between the CROSS state (light travels from one side of the first bus to the second bus on the other side when bias voltage $V_{bias}$ is $V_o$=0V) and the BAR state (light stays within the bus on the same side when bias voltage is $V_{dd}$) by changing the carrier concentration of the ITO layer 112, thus further affecting the effective index of the supermodes governing this device; three lowest-order TM modes are spread across the cross-section of this 3-waveguide structure and can be regarded as the supermodes TM$_1$, TM$_2$, and TM$_3$ of the device, shown in FIG. 1A.

Regarding signal switching quality, we define the extinction ratio (ER) as the power output ratio for the BAR and CROSS port separately as its desired state (when the light is expected to be transmitted out from this port) divided by its undesired state (when the light is expected to go to the other port), Equations (1) and (2), where port 1 102 is the injection port while port 2 106 and 3 108 are the BAR and the CROSS ports. The insertion loss (IL) of the BAR and CROSS ports are defined as the power ratio between the desired port and the injection port (Equations 3, 4).

$$ER_{Bar} = 10\log\left[\frac{P_{bar} - V_{dd}}{P_{bar} - V_o}\right] \quad (1)$$

$$ER_{Cross} = 10\log\left[\frac{P_{cross} - V_o}{P_{cross} - V_{dd}}\right] \quad (2)$$

$$IL_{Bar} = 10\log\left[\frac{P_{bar} - V_{dd}}{P_{injection}}\right] \quad (3)$$

$$IL_{Cross} = 10\log\left[\frac{P_{cross} - V_o}{P_{injection}}\right] \quad (4)$$

$$L_B, L_C = \frac{\lambda}{2(nTM_1 - nTM_2)} \quad (5)$$

The coupling length 120 difference, which is a function of the applied control bias, between the two voltage states (CROSS and BAR), needs to be maximized in order to optimize ER and the power consumption as well as IL. This leaves two design choices for an optical signal patch at the zero-voltage case: either the device is in the CROSS or BAR output state. However, since the BAR state has a longer coupling length ($L_B$) than the CROSS state ($L_C$), the physical device length of this 3-waveguide coupler is set to be the coupling length at the CROSS state.

The coupling length formula for both cases is given by the difference between two symmetric TM mode indices and is related to the wavelength of the light source (Equation 5). While [21] has shown 1.3 dB and 2.4 dB insertion losses for the CROSS and BAR switching states, respectively, two fixed values for the voltage-altered ITO effective indices. However, the Drude model for ITO allows us to select any arbitrary bias point, just limited by electrostatics such as oxide quality and contact resistance [19]. Therefore, to obtain an optimized device design, we apply the Drude model to predict the effective indices of ITO at different wavelengths [34]. Furthermore, the physical dimensions of the switch need to be optimized in order to obtain the lowest loss with the highest extinction ratios.

The insertion loss, footprint, and energy consumption of the ITO switch model in [21] are already reasonably low, however, to use it as the basic element in an optical router, any small improvement of the switch IL are amplified by the cascaded optical router design. For example, a 0.1 dB loss reduction of a single 2×2 switch results in an over 300% (~5 dB) energy savings for an 8×8 mesh network with 64 routers in total and with 8 switches in each router (calculated for the longest routing path).

Different from the operating principle mentioned before, the Adiabatic Elimination (AE), which is used for complicated multi-level systems, can be regarded as the other operating principle in such 3-waveguide structure. The original adiabatic theorem was proposed back to 1920s, and it was stated as 'a physical system remains in its instantaneous eigenstate if a given perturbation is acting on it slowly enough and if there is a gap between the eigenvalue and the rest of the Hamiltonian's spectrum'. Three lambda system in silicon photonics, as the simplest case of the AE application, can be used in the three-waveguide directional coupler [35]. However, some of the states in the device are not desired due to the high loss or the complexity it brings to the system. By applying the AE, the certain state is able to be detuned from the working states by changing the dimensions of the structure [36].

In particular, the three-waveguide directional coupler with three low-order modes spread across the cross-section of this three-waveguide structure can be reduced to a two-waveguide coupling system by tuning the middle switching island into the 'dark mode' (or AE switch), as shown exemplarily in FIGS. 2A, 2B, and 2C.

Fundamentally, when this three-waveguide coupler is designed (or tuned) to the AE region, the light in Mode A, at the top of the graphs, will only sit in the middle switching island 111, and Mode B (middle graph) and C (bottom graph) will only have light in the outer bus waveguides 124, 126 which acts as a two waveguides directional coupler. In other words, if the light source incident from either bus waveguide, it will be directly coupled to the other side of the bus without staying in the middle switching island 111. Such property has a great potential in the optical switching and modulation, as well as the novel optical computing, such as the optical residue number system and the neuromorphic computing. However, although this AE application has been approved in silicon photonics, the AE region is achieved by adjusting the design parameter. In other words, that prior design is purely passive without any biasing and cannot change its operating region. Thus, it is more like a proof-of-concept rather than an actual device for real applications.

Here, the AE status can also be actively reached by biasing the plasmonic material (e.g. Indium tin oxide) in the middle switching island 111. At one state (either Bar or Cross), the light will not go through the switching island but directly coupled into the other bus waveguide. In other words, for one state, this 3-waveguide system could be simplified to a 2-waveguide system. Different from the hybrid photonic-plasmonic switch, which operates in the regions 5, 7 in FIG. 2A at the OFF and ON states respectively, such design can also be tuned to operate in the 7, 9 regions for ON and OFF states. Because of the trend of the multi-core communication on-chip, each channel could simply have tens of switches in the routers to either bypass. And this requires the switch to have minimum insertion loss at the bypassing state. Thus, to design an optical switch that operates at the AE region 9 and the critical coupling region 7 can eliminate most of the bypassing loss and has great potential in optical communication networks.

As shown in FIGS. 3A through 3D, in this design, by changing the bias voltage can "shift" the critical coupling region and thus create a difference in the mode indices. Thus, as shown in FIG. 3A and FIG. 3C, when no voltage is applied to the switching island 110, this new three-waveguide coupler is in the AE region, which basically can be regarded as the passive two-waveguide silicon coupler with very long coupling length. However, after applying a voltage, as shown in FIG. 3B and FIG. 3D, the device will be tuned to its critical coupling state with relatively short coupling length. As tuned, the switch length (physical length of the switch 111) is exactly the coupling length $L_C$ of the ON state, which maximizes the switching capability. At the OFF state, there will be barely any light coupled to the other side of the bus due to its long coupling length at the OFF state. In this way, the bypassing (Bar state) insertion loss is dramatically reduced. Even though based on the simulation results, the switching ability of the middle island is minimum (around 0.7 dB extinction ratio), the insertion loss is less than 0.007 dB/μm which proofs that this 3-WG switch is actually operating in the AE region. This can also be confirmed by the FDTD simulation that most of the light stays within the buses but not in the middle switching island.

To further improve the performance of this AE switch, the diameters of the middle switching island 110, as well as the bus waveguides 124, 126, need to be optimized for better overlapping with the modes. Moreover, a switching island that covered by the ITO layer (not only on top but also on both side of the waveguide) with a middle switch waveguide 110 near its cutoff dimension provides higher index shifting between the ON and the OFF states and further reduces the length of the switch.

Switch Optimization

Although the goal of the optimization is to reduce IL for both CROSS and BAR states while maintaining good ER, they cannot be improved simultaneously due to different underlying operation principles and due to the relative scaling of each of the variables; at the CROSS state, the light needs to first couple to the switching island and then to the second bus.

Thus, the theoretical power that is able to be transmitted from the injection port to the CROSS port (power transmission efficiency) is critical, which determines the insertion loss ($IL_C$) at the CROSS state, and can be improved by optimizing the ratio of the island width ($W_{island}$) to the gap between the buses and the island (Gap). This is exemplarily shown in FIG. 4A. The theoretical maximum power transmission rate (i.e. critical coupling) of the 3-waveguide coupler model at the CROSS-state occurs when the mode indices meet the condition in Equation 6 [37].

$$2n_{TM2} - (n_{TM1} + n_{TM2}) = 0 \quad (6)$$

The entire optimization process follows three steps: 1) power transmission efficiency and average loss optimization by sweeping the Gap and the $W_{island}$; 2) insertion loss and extinction ratio optimization by sweeping the height of the switching island $H_{island}$; 3) further performance improvement by sweeping the carrier concentration of the ITO layer.

As a first optimization step, the diameter of the bus waveguides is preferably set to be 400 nm×340 nm (width× height) to keep a high spatial mode confinement within the 1.4-1.7 μm single-mode operation spectrum. And $H_{island}$ is preferably chosen to be 340 nm as an initial empirical starting point for the first optimization step. However, changing the width of the switching island also changes the $TM_1$, $TM_2$, $TM_3$ indices. Thus, changing the two variables (Gap and $W_{island}$) in this step also requires the thickness of both $SiO_2$ layers ($H_{SiO_2}$) to be adjusted correspondingly in order to adhere to Equation 6. Notably, there is no valid oxide thickness to satisfy Equation 6 beyond a certain $W_{island}$ based on Lumerical MODE simulation results. Therefore, $H_{SiO_2}$ is fixed to 50 nm for island widths larger than 425 nm. Here Gap and $W_{island}$ are swept in the range of 50~400 nm and 250~500 nm respectively, and the results are evaluated by the average channel loss of a 5×5 router, which can be regarded as a weighted metric that includes the insertion loss for both states, calculated as shown in Equation 7, and the weightings depending on the router structure will be discussed in more details in the following sections.

$$\text{Ave. Channel Loss} = \quad (7)$$
$$\begin{cases} 2.4 \cdot IL_{Cross} + 0.8 \cdot IL_{Bar}, & \text{when } 2IL_{Cross} \leq IL_{Bar} \\ 2.1 \cdot IL_{Cross} + 0.95 \cdot IL_{Bar}, & \text{else} \end{cases}$$

Figure 4A:
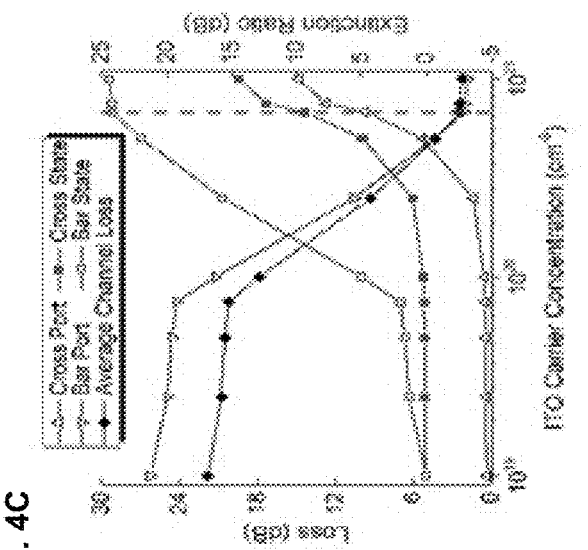
FIGS. 4A through 4C show an exemplary 2×2 switching element optimization. More specifically.

The results show that 2.1 dB is the lowest average channel loss at 300 nm $W_{island}$ with 250 nm Gap, as exemplarily shown in FIG. 4A. But with denser on-chip integration, energy efficiency and high-speed design in mind, we limited the maximum device length up to 10 μm. The shaded region in FIG. 4A is excluded from optimization routing. By analyzing the remainder region, a 2.5 dB average channel loss is found at 275 nm $W_{island}$ with 150 nm Gap as the minimum loss among this sweep. Note, although the insertion loss at each state is not shown, it is important to mention that the sweet spots of insertion loss (which has an inverse relation with power transmission efficiency) at the BAR and the CROSS states distribute in different regions of the heat map. Specifically, a lower loss could be found at the bottom-left corner at the CROSS state due to shorter coupling length, while the loss at the BAR state favors larger gaps at the top because of higher $L_B/L_C$ ratio. Therefore, the average channel loss in FIG. 4A can be regarded as a loss (or power transmission efficiency) trade-off combination of two different states.

Figure 4B:
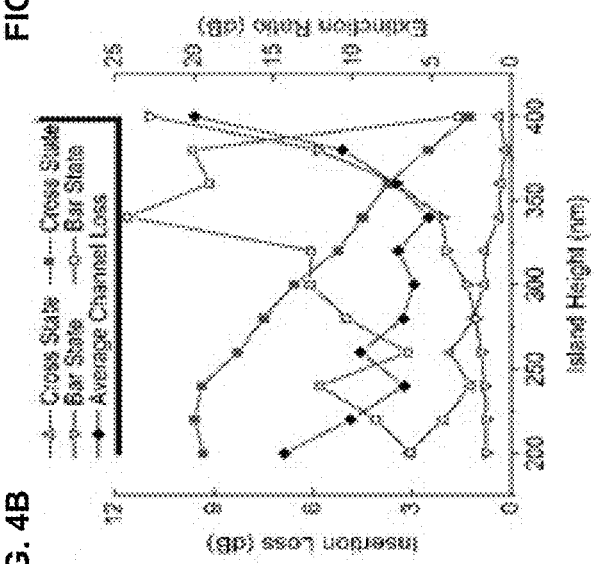
Figure 4C:
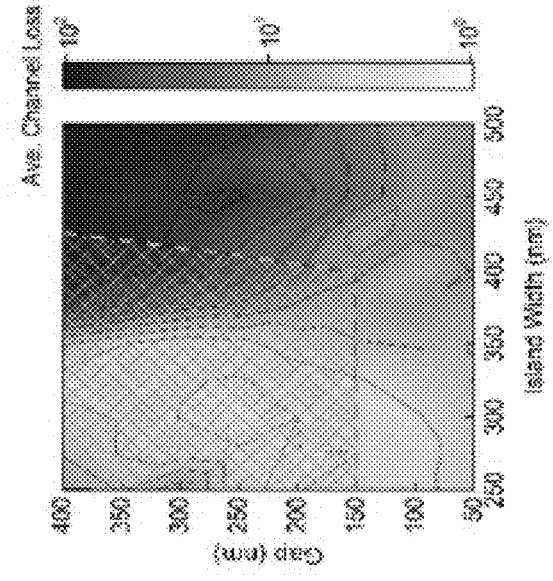

After this first step, which provides the highest power transmission efficiency under the aforementioned conditions, there is still room to optimize the height of the switching island [21]. Sweeping the height of the silicon switching island $H_{island}$ below (or above) the height of the bus ('detuning') shifts the TM supermodes in Equation 6, and thus needs to be compensated by the thickness of oxide layers as well. Altering the $H_{island}$ from 200 nm to 400 nm, there is a trade-off between the insertion losses of two states, as shown in FIG. 4B. This "detuning" reduces IL more than 10 dB at the BAR state, however, also causes an additional 2.7 dB loss at the CROSS state. After applying the average channel loss metric, the lowest loss is found at $H_{island}$=340 nm which happens to be the height used in the first optimization step. This value is just for this specific 5×5 router only, and with weighted probabilities for two different states and a different application, there may result another $H_{island}$. For example, if it were to be assumed that the two states of the switch have equal probability to occur, the average loss of the switch could be reduced by 0.4 dB per switch at 240 nm $H_{island}$. In addition, the high BAR state extinction ratio is another reason to choose 340 nm $H_{island}$ without detuning.

Once the optimal island height is found, the carrier concentration of the ITO layer is the last variable that may affect the performance of the switch. It is assumed that an experimentally proven carrier concentration change from $10^{19}$-$10^{21}$ cm$^{-3}$ is the bounds for the two bias states [25]. With higher bias voltage, the carrier concentration of ITO increases due to an increased index change and eventually 'tunes' the switch to its BAR state. This can be proved by the rapid drop of IL at the BAR port after passing $10^{20}$ cm$^{-3}$ since there is efficient index change to make $L_B$ enough longer than $L_C$ so that the light output at the BAR state will remain in the same injection bus. After the carrier concentration passes the epsilon-near-zero (ENZ) point (6.8×$10^{20}$ cm$^{-3}$), the average channel loss, as well as the ERs, saturate with little improvements. Thus, the ENZ point at 4V bias voltage is the most energy efficient BAR state, since the optical mode is here most 'spread out' given the vanishing index (i.e. the strongest LMI). The final optimized design and resulting performance parameters of the 2×2 hybrid plasmonic-photonic switch are summarized in Table 1. Thus, Table 1 shows the critical design parameters and performance list of two design cases. The energy consumption is calculated based on capacitor charging energy ½ $CV^2$, and the switching time is based on device RC delay. The coupling length is calculated based on Equations 5 and 6; the capacitance is calculated based on the dimensions of the middle switching island (as a capacitor), the equation is $C=\varepsilon_r\varepsilon_0(A/d)$; the 500 Ohm resistance is a common assumption in our field; 4 Volt driving voltage is based on our previous experimental result; the energy per switching is calculated based on ½ $CV^2$ where C is the capacitance and V is the driving voltage; the switching time is calculated based on 1/RC, where R is the resistance and C is the capacitance; the rest insertion losses and extinction ratios are defined in Eqn. 1-4, and they are all simulation results.

TABLE 1

| Parameter | Values |
| --- | --- |
| Bus Waveguide Diameter | 400 nm × 340 nm |
| Switch Waveguide Diameter | 275 nm × 340 nm |

TABLE 1-continued

| Parameter | Values |
| --- | --- |
| Gap | 150 nm |
| ITO Height | 20 nm |
| Oxide Height | 16 nm |
| Coupling Length | 8.9 μm |
| Capacitance | 1.63 fF |
| Resistance | 500 Ω |
| Bias Voltage | 4 Volt |
| Energy per Switching | 13.1 fJ |
| Switching Time | 5.1 ps |
| BAR Insertion Loss | 2.1 dB |
| CROSS Insertion Loss | 0.4 dB |
| BAR Extinction Ratio | 24.2 |
| CROSS Extinction Ratio | 9.3 |

Hybrid Photonic-Plasmonic Router Performance

The elemental 2×2 switches are interconnected with optical waveguides forming a switching fabric such as an N×N spatial routing switch or "matrix switch" where N is the number of input ports, as well as the number of output ports. For such an N×N switching network router, there are several practical architectures or layouts (Benes, Clos, etc). It is preferable to build the non-blocking router in something known as the permutation matrix, whereas the schematic design of this matrix was presented in prior works in FIG. 2(b) of [38], and the specific design of the matrix using 3-waveguide directional-coupler switches was given in FIG. 5 of [39], where this 3-waveguide design is employed here. Generally speaking, the permutation matrix has the advantage that no waveguide crossings (intersections) are used throughout in the matrix, but the matrix has the disadvantage that the overall insertion loss between an input-i and an output-j depends upon the length of the optical path traversed between the two inputs, a length that varies depending upon the specific selected i and j pair. In other words, the IL is path dependent.

The total number of 2×2 switches needed for a non-blocking router scales with $(N-1)^2/2$, where N is an odd number of ports of that router [8]. Thus, as a router for an optical mesh network of a NoC requires 4 ports to connect to the north, south, east and west neighbors, and 1 additional port for connection to the local processing core. This results in eight 2×2 hybrid switches needed to achieve 5×5 non-blocking routing functionality that assumes assigning a random input port to a random output port without disturbing other data streams as shown in FIGS. 5A and 5B. The eight switches are shown in FIG. 5A as "a," "b," "c," "d," "e," "f," "g," and "h." The five input ports 502 are numbered "1" through "5" at the bottom of FIGS. 5A and 5B, while the five output ports 504 are numbered "1" through "5" at the top of FIGS. 5A and 5B. As shown, a pair of two switches are positioned between each waveguide pair and spaced apart from each other along the longitudinal length of the waveguides. In addition, the switch pairs are offset from each other in the longitudinal direction. That is, the first and third pairs of switches a-b, e-f are offset with respect to the second and fourth pairs of switches e-f, g-h so that they do not transversely align. In that manner, an optical signal at any of the input ports 502 can be transmitted to any of the output ports 504 via one or more of the switches a-h. In the exemplary embodiment shown, the first switch pair a-b can be transversely aligned with the third switch pair e-f, and the second switch pair c-d can be transversely aligned with the fourth switch pair g-h, which also forms a diagonal alignment between the switches (e.g., see switches a-c-f-h and switches d-f-g).

FIG. 5B also shows a discrete ITO switch element 506, substantially similar to that diagrammed in FIG. 1. The other input ports are still able to maintain connections with the remainders of the output ports without affecting the initially set switches. Moreover, self-communication (communication between same input and output port number, resulting in a U-turn) is forbidden because i) it can be achieved with higher energy- and latency-efficiency with other local (electrical) interconnect links, and ii) avoiding self-communication can simplify the router from $N^2$ number of switches required for all-to-all connection down to only $(N-1)^2/2$, which can also reduce the average loss of the router.

Figure 6B:
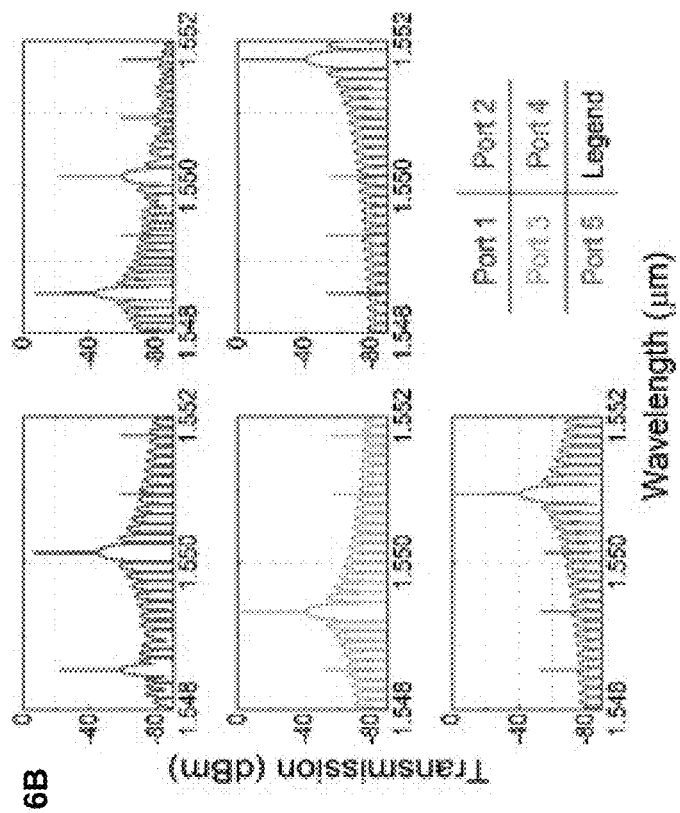
FIGS. 6A and 6B show a router performance simulation. The router is configured to route the signal from each port to the next one (i.e. port 1 to port 2, port 2 to port 3, etc.). More specifically, FIG. 6A show a single-wavelength-single-input from port 1 for operation spectrum testing. The shaded area in FIG. 6A represents the 3 dB bandwidth which covers from 1.49 μm to 1.62 μm wavelength range.
Figure 6A:
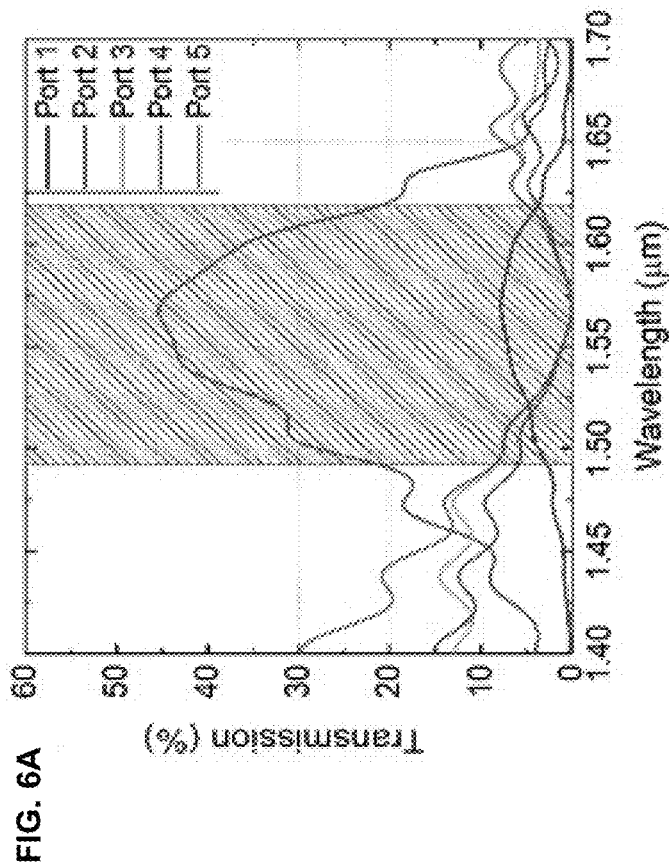

The operational spectrum results for each output port with respect to cross-coupling from other routing paths are key parameters for signal quality and to assess the WDM ability, as exemplarily shown in FIGS. 6A and 6B. For example, configuring the router to establish the following paths: 1 to 2, 2 to 3, 3 to 4, 4 to 5 and 5 to 1, and injecting a unity laser power ($P_{laser}$=100% a.u.) from port 1, results in the majority of the signal to be routed to port 2, as designed while the leakage is delivered to the remaining four output ports. The 3 dB spectral (not temporal) bandwidth, for example, the routed signal dropping to −3 dB from maximum, is 106 nm wide on average for all 20 different routing paths. That is 130 nm from 1.49 to 1.62 μm, as shown on the x-axis of the red shaded area of FIG. 6A. The broad bandwidth with an average signal-to-noise ratio (SNR) of 123 resulting in an average channel capacity of 10×5 Gbps per routing path based on CWDM standard across the S, C and L bands with 20 nm wavelength spacing, shown in FIG. 6A, and 200 Gbps in total if all five ports are used. This is shown as 10×6 Gbps in FIG. 6A due to the above average bandwidth. Here, the SNR is defined as the power ratio between the signal and the light leakage to the other ports.

Furthermore, the data capacity can be improved by using DWDM in C band (1530~1560 nm wavelength) with 0.8 nm wavelength spacing which supports 40 wavelengths and results in 400 Gbps data capacity per channel, as shown in FIG. 6B. This data capacity is calculated based on the standard of the 10 Gigabit Ethernet with 10 Gbps data rate per wavelength [40]. However, the ideal Shannon data capacity based on the device 3 dB bandwidth and average SNR is about 92 Tbps, based on Equation 8 below, which shows the maximum capacity of a single routing path with advanced coding strategies such as PAM, QAM, and PWM, etc. [41]. This router is WDM capable in that is it supports multiple wavelengths per light path. While individual wavelength routing is not possible, multiple pre-multiplexed wavelength channels can be routed jointly, and post-routing demultiplexed. Doing so increases the data capacity of this particular circuit-switched path by a factor equal to the number of wavelengths used (e.g. 100). This could be exploited in applications such as optical residue computing or optical reduction operations.

$$\text{Shannon Capacity} = BW \cdot \log_2(1+\text{SNR}) \quad (8)$$

The port-to-port crosstalk is tested by injecting five light source in five different wavelengths and we find that the port-to-port crosstalk is at least −13 dB higher than the signal power received by other ports, shown FIG. 6B. Different from ring-based WDM optical routers that only support one wavelength at a given time window, the WDM ability of this router allows for multiple wavelengths to be supported simultaneously with no thermal resonance tuning needed. The average performance for all 20 different paths is described in more detail below.

Operation

A single 2×2 ITO switch does not consume any active (voltage-driven) energy in its CROSS state operation since the bias signal equals to zero. Here, the ITO layer has dielectric-like properties and exhibits low insertion loss in this 3-waveguide coupler structure just like passive silicon couplers. However, applying the bias voltage to the ITO layer causes changes to its metallic state and the coupling length increases accordingly. Although light cannot be coupled to the bus on the other side due to insufficient coupling length, the high-loss plasmonic mode inflicts some amount of BAR state loss since the optical mode 'bounces' back from the metallic center island (non-zero interaction with the plasmonic mode).

As a result, the BAR-states' insertion loss, $IL_B$, is higher than that for the CROSS state. The loss difference of the BAR and CROSS states of the router allows reconfiguration to reduce the overall routing loss by choosing a path routing with an increases number of CROSSBAR switching events, when able. For example, to route a signal from input port 3 to output port 4, all the possible routing paths with switch states are listed in Table 2 and the one with more CROSS state and less BAR state provides the lowest routing loss. Following this routing strategy, the average channel loss for all 20 different routing paths can be reduced to 2.5 dB for single routing path with 1.1 dB as the best case, and 3.2 dB as the worst case. Thus, Table 2 shows routing path options from port 3 to port 4 of the theoretical ideal case. The router states from left to right represents the switch states from switch a to switch h.

TABLE 2

| Path Options | Switch States | | | | | | | | Loss (dB) |
|---|---|---|---|---|---|---|---|---|---|
| | a | b | c | d | e | f | g | h | |
| 1 | — | Bar | Cross | Bar | Bar | — | — | — | 6.6 |
| 2 | — | — | — | Cross | Cross | Cross | Bar | — | 3.1 |
| 3 | — | — | Bar | Cross | Bar | Bar | — | — | 6.6 |

Moreover, a comparison between this hybrid router and other photonic routers is summarized in Table 3. Note, even though the response time of the router mainly depends on RC delay of the switch itself, the switching speed is limited up to 10 GHz, which is commonly accepted in the optical communication community when concerned with heat dissipation and energy efficiency [1, 42]. Table 3 shows parameter comparison among this hybrid photonic-plasmonic router and other photonic router designs. MZI, MRR, and IPS stand for Mach-Zehnder interferometer, micro-ring resonator, and hybrid photonic-plasmonic switch. The projects of Li [15], Ji [7], Yaghoubi [43] and Jia [8] are results from fabricated and tested devices, while Dang [44] and this work are results based on numerical simulations.

TABLE 3

| Project | X. Li (2013) | R. Ji (2013) | D. Dang (2015) | E. Y. (2016) | H. Jia (2016) | This Work |
|---|---|---|---|---|---|---|
| Key Element | MZI | MRR | MRR | MZI | MRR | HPPS |
| Element Number | 10 | 16 | 16 | 20 | 8 | 8 |
| Single Wavelength | 32 | 13 | 40 | 20 | 32 | 50 |
| Data Capacity (Gbps) | | | | | (1280 for WDM) | (250~2000 for WDM) |
| Energy Consumption (fJ/bit) | 781* | — | 0.4 (fW/bit) | 1442* | 68.2 | 5.2 (1.0~0.1 for WDM) |
| Average Loss (dB) | 2.4 | 1* | 1.6* | 6.0* | 16.5 | 2.5 |
| Maximum Loss (dB) | 9.6 | — | 2.4* | 8.4* | 18.3 | 3.2 |
| Area (um²) | 9.6 × 10⁵ | 4.6 × 10⁵ | — | — | 4.8 × 10⁵ | 200 |
| 3 dB Bandwidth (nm) | 40 | 0.4 | ** | 100 | 0.6 | 106 |
| SNR | 24 | 10 | — | 34 | 11 | 123 |
| Switching Time (ps) | 10⁶/10³*** | — | 100 | — | 2 × 10⁷ | 100 |

*Numbers are not directly given and calculations or approximations are used to obtain the values.
** This device only operates at two certain wavelengths: 1547.5 and 1550 nm.
***This device allows both slow (µs) and fast (ns) switching by thermal and electrical tuning.

General Scaling Pattern

Although the 5×5 design is exemplarily shown here, it will be clear to one of ordinary skill in the art that this double biased hybrid photonic-plasmonic broadband switch is suitable for other routing sizes from 3 up to a few tens of ports. In general, the number of switches needed for a wide-sense non-blocking router is $(N-1)^2/2$ when N is odd and $N(N-2)/2$ when N is even. While for a strict-sense non-blocking router design, $[(N-1)^2/2]+2$ switches are needed for odd N and $[N(N-2)/2]+2$ for even N. The difference between the wide-sense and the strict-sense non-blocking is defined as whether the self-communication (same input-output connection, e.g. input port 1 to output port 1) is prohibited. For a wide-sense non-blocking router, same ports connections are not necessary while for the strict-sense one, any connection should be fully supported by the design.

Conclusion

Disclosed herein is a hybrid photonic-plasmonic non-blocking broadband on-chip router on a Silicon photonics platform. The router response time (0.1 ns) and high-energy efficiency (1.0 and 0.1 fJ per switching for CWDM and DWDM respectively) are enabled by hybridizing plasmonics with a photonic device. In comparison with microring- and Mach Zehnder-based photonic routers, this router operates over a broadband 3-dB signal discrimination bandwidth over 100 nm, allowing up to 2 Tbps theoretical noisy Shannon channel capacity. The design is enabled by a hybrid photonics-plasmonic integration strategy featuring cascaded 3-waveguide-based 2×2 switches, utilizing ITO's strong voltage-controlled index tunability. Using these plasmonic switches allows compact router designs of 200 µm² footprint and $10^2$ times area-utilization improvement. The high performance and scalability of this router are promising features for large-scale multi-core optical networks requiring all-optical routing applications.

It is further noted that the description uses several geometric or relational terms, such as parallel, elongated, transverse. In addition, the description uses several directional or positioning terms and the like, such as top, bottom, left, right, and middle. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the various sizes, shapes and dimensions are exemplary to illustrate the scope of the invention and are not limiting. The sizes can vary depending on the specific application without departing from the spirit and scope of the invention. For instance, if one size (length, height, width, etc.) changes, other parameters can be re-optimized to achieve the same/similar switching function.

The following references are hereby incorporated by reference. [1] Miller, D. A. (2017). Attojoule optoelectronics for low-energy information processing and communications. Journal of Lightwave Technology, 35(3), 346-396; [2] Esmaeilzadeh, H., Blem, E., Amant, R. S., Sankaralingam, K., & Burger, D. (2013). Power challenges may end the multicore era. Communications of the ACM, 56(2), 93-102; [3] Henkel, J., Khdr, H., Pagani, S., & Shafique, M. (2015, June). New trends in dark silicon. In Proceedings of the 52nd Annual Design Automation Conference (p. 119). ACM; [4] Kim, B. W., Lee, H. H., Lee, J. H., & Kim, B. T. (2015). U.S. Pat. No. 9,008,513; [5] Agrawal, G. P. (2012). Fiber-optic communication systems (Vol. 222). John Wiley & Sons; [6] Narayana, V. K., Sun, S., Badawy, A. H. A., Sorger, V. J., & El-Ghazawi, T. (2017). MorphoNoC: Exploring the design space of a configurable hybrid NoC using nanophotonics. Microprocessors and Microsystems.

[7] Ji, R., Xu, J., & Yang, L. (2013). Five-port optical router based on microring switches for photonic networks-on-chip. IEEE Photon. Technol. Lett, 25(5), 492-495; [8] Jia, H., Zhao, Y., Zhang, L., Chen, Q., Ding, J., Fu, X., & Yang, L. (2016). Five-Port Optical Router Based on Silicon Microring Optical Switches for Photonic Networks-on-Chip. IEEE Photonics Technology Letters, 28(9), 947-950; [9] Miller, D. A. (2009). Device requirements for optical interconnects to silicon chips. Proceedings of the IEEE, 97(7), 1166-1185; [10] Hamedani, P. K., Jerger, N. E., & Hessabi, S. (2014, September). QuT: A low-power optical network-on-chip. In Networks-on-Chip (NoCS), 2014 Eighth IEEE/ACM International Symposium on (pp. 80-87). IEEE; [11] Liu, K., Sun, S., Majumdar, A., & Sorger, V. J. (2016). Fundamental scaling laws in nanophotonics. Scientific Reports, 6.

[12] Sun, C., Chen, C. H. O., Kurian, G., Wei, L., Miller, J., Agarwal, A., Peh L. S., Stojanovic, V. (2012). DSENT—a tool connecting emerging photonics with electronics for opto-electronic networks-on-chip modeling. In Networks on Chip (NoCS), 2012 Sixth IEEE/ACM International Symposium on (pp. 201-210). IEEE; [13] Wassel, H. M. G., Dai, D., Tiwari, M., Valamehr, J. K., Theogarajan, L., Dionne, J., Chong, F. T., Sherwood, T. (2012). Opportunities and challenges of using plasmonic components in nanophotonic architectures. IEEE Journal on Emerging and Selected Topics in Circuits and Systems, 2(2), 154-168; [14] Treyz, G. V., May, P. G., & Halbout, J. M. (1991). Silicon Mach-Zehnder waveguide interferometers based on the plasma dispersion effect. Applied physics letters, 59(7), 771-773; [15] Li, X., Xiao, X., Xu, H., Li, Z., Chu, T., Yu, J., & Yu, Y. (2013). Mach-Zehnder-based five-port silicon router for optical interconnects. Optics letters, 38(10), 1703-1705; [16] Ye, C., Khan, S., Li, Z. R., Simsek, E., & Sorger, V. J. (2014). λ-size ITO and graphene-based electro-optic modulators on SOI. IEEE Journal of Selected Topics in Quantum Electronics, 20(4), 40-49.

[17] S. K. Pickus, S. Khan, C. Ye, Z. Li, and V. J. Sorger, "Silicon Plasmon Modulators: Breaking Photonic Limits" IEEE Photonic Society, 27, 6 (2013); [18] C. Huang, S. Pickus, R. Lamond, Z. Li, V. J. Sorger, "A Sub-λ Size Modulator Beyond the Efficiency-Loss Limit" IEEE Photonics Journal 5, 4 (2013); [19] Ma, Z., Li, Z., Liu, K., Ye, C., & Sorger, V. J. (2015). Indium-tin-oxide for high-performance electro-optic modulation. Nanophotonics, 4(1), 198-213; [20] Liu, K., Li, N., Sadana, D. K., & Sorger, V. J. (2016). Integrated nanocavity plasmon light sources for on-chip optical interconnects. ACS Photonics, 3(2), 233-242; [21] Ye, C., Liu, K., Soref, R. A., & Sorger, V. J. (2015). A compact plasmonic MOS-based 2×2 electro-optic switch. Nanophotonics, 4(3), 261-268; [22] Ma, Z., Tahersima, M. H., Khan, S., & Sorger, V. J. (2017). Two-Dimensional Material-Based Mode Confinement Engineering in Electro-Optic Modulators. IEEE Journal of Selected Topics in Quantum Electronics, 23(1), 81-88.

[23] Tahersima, M. H., & Sorger, V. J. (2015). Enhanced photon absorption in spiral nanostructured solar cells using layered 2D materials. Nanotechnology, 26(34), 344005; [24] Fratalocchi, A., Dodson, C. M., Zia, R., Genevet, P., Verhagen, E., Altug, H., & Sorger, V. J. (2015). Nano-optics gets practical. Nature Nanotechnology, 10(EPFL-ARTICLE-205392), 11-15; [25] V. J. Sorger, D. Kimura, R.-M. Ma and X. Zhang. Ultra-compact Silicon nanophotonic Modulator with broadband Response" Nanophotonics 1, 1, 17-22 (2012); [26] Li, N., Liu, K., Sorger, V. J., & Sadana, D. K. (2015). Monolithic III-V on silicon plasmonic nanolaser structure for optical interconnects. Scientific reports, 5; [27] Liu, K., & Sorger, V. J. (2015). Electrically-driven carbon nanotube-based plasmonic laser on silicon. Optical Materials Express, 5(9), 1910-1919; [28] Zhao, H., Wang, Y., Capretti, A., Dal Negro, L., & Klamkin, J. (2015). Broadband electroabsorption modulators design based on epsilon-near-zero indium tin oxide. IEEE Journal of Selected Topics in Quantum Electronics, 21(4), 192-198.

[29] Sun, S., Badawy, A. H. A., Narayana, V., El-Ghazawi, T., & Sorger, V. J. (2015). The case for hybrid photonic plasmonic interconnects (HyPPIs): Low-latency energy-and-area-efficient on-chip interconnects. IEEE Photonics Journal, 7(6), 1-14; [30] Sun, S., Narayana, V. K., Mehrabian, A., El-Ghazawi, T., & Sorger, V. J. (2016). A Universal Multi-Hierarchy Figure-of-Merit for On-Chip Computing and Communications. arXiv preprint arXiv:1612.02486; [31] Narayana, V. K., Sun, S., Mehrabian, A., Sorger, V. J., & El-Ghazawi, T. (2017). HyPPI NoC: Bringing Hybrid Plasmonics to an Opto-Electronic Network-on-Chip. arXiv preprint arXiv:1703.04646; [32] Mehrabian, A., Sun, S., Narayana, V. K., Sorger, V. J., & El-Ghazawi, T. (2017). D3NOC: Dynamic Data-Driven Network On Chip in Photonic Electronic Hybrids. arXiv preprint arXiv:1708.06721; [33] Oulton, R. F., Sorger, V. J., Genov, D. A., Pile, D. F. P., & Zhang, X. (2008). A hybrid plasmonic waveguide for subwavelength confinement and long-range propagation. Nature Photonics, 2(8), 496-500.

[34] Amin, R., Suer, C., Ma, Z., Sarpkaya, I., Khurgin, J. B., Agarwal, R., & Sorger, V. J. (2017). A deterministic guide for material and mode dependence of on-chip electro-optic modulator performance. Solid-State Electronics, 136, 92-101; [35] Brion, E., Pedersen, L. H., & Mølmer, K. (2007). Adiabatic elimination in a lambda system. Journal of Physics A: Mathematical and Theoretical, 40(5), 1033; [36] Mrejen, M., Suchowski, H., Hatakeyama, T., Wu, C., Feng, L., O'Brien, K., . . . & Zhang, X. (2015). Adiabatic elimination-based coupling control in densely packed subwavelength waveguides. Nature communications, 6.

Donnelly, J. P., Haus, H. A., & Whitaker, N. (1987). Symmetric three-guide optical coupler with nonidentical center and outside guides. IEEE Journal of Quantum Electronics, 23(4), 401-406; [37] Soref, R. (1976). Properties of the terminated optical crossbar matrix. Applied Optics, 15 (12) 2950-2951; [38] Soref, R. (2014). Mid-infrared 2×2 electro-optical switching by silicon and germanium three-waveguide and four-waveguide directional couplers using free-carrier injection. Photonics Research, 2 (5) 102-112; [39] IEEE Standards Association. (2012). IEEE Standard For Ethernet. IEEE Std, 802-3; [40] Shannon, C. E., & Weaver, W. (1998). The mathematical theory of communication. University of Illinois press; [41] Sun, C., Wade, M. T., Lee, Y., Orcutt, J. S., Alloatti, L., Georgas, M. S., et al. (2015). Single-chip microprocessor that communicates directly using light. Nature, 528(7583), 534-538; [42] Yaghoubi, E., & Reshadi, M. (2016). Five-Port Optical Router Design Based on Mach-Zehnder Switches for Photonic Networks-on-Chip. Journal of Advances in Computer Research, 7(3), 47-53; [43] Dang, D., Patra, B., Mahapatra, R., & Fiers, M. (2015, January). Mode-division-multiplexed photonic router for high performance network-on-chip. In VLSI Design (VLSID), 2015 28th International Conference on (pp. 111-116). IEEE.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An electro-optical switch comprising:
   a substrate;
   a first optical waveguide disposed on the substrate;
   a second optical waveguide disposed on the substrate;
   a third optical waveguide disposed on the substrate situated in between the first and second optical waveguides;
   a first low dielectric layer disposed on the third optical waveguide;
   a conducting oxide layer that can be electro-optical tuned between dielectric and metallic modes disposed on the first low dielectric layer in between the first and second optical waveguides;
   a second low dielectric layer disposed on the conducting oxide layer;
   a metal layer disposed on top of the second low dielectric layer;
   wherein the first and second low dielectric layers, the conducting oxide layer, the metal layer, and the third optical waveguide effect optical switching.

2. The electro-optical switch of claim 1, wherein the first and second low dielectric layers, the conducting oxide layer, and the metal layer effect optical switching across a certain range of light wavelengths.

3. The electro-optical switch of claim 1, wherein the switch is intrinsically in an "OFF" state when there is no voltage applied.

4. The electro-optical switch of claim 1, wherein the switch provides optimized light transfer from the first optical waveguide to the second waveguide.

5. The electro-optical switch of claim 1, wherein the coupling length of the switch is 8.9 µm.

6. The electro-optical switch of claim 1, wherein the switch operates at a wavelength bandwidth above 100 nm.

7. The electro-optical switch of claim 1, wherein the switch is a hybrid photonic-plasmonic switch.

8. The electro-optical switch of claim 1, wherein the switching island is designed to bias the conduction oxide layer from both the top and the bottom to improve the index tuning.

9. The electro-optical switch of claim 1, wherein the third waveguide may be tuned to dark mode.

10. The electro-optical switch of claim 1, wherein the total average routing insertion loss is no greater than 1.3 dB.

11. A router comprised of:
    a plurality of input ports and output ports and a plurality of electro-optical switches comprising hybrid photonic-plasmonic switches, wherein each electro-optical switch is comprised of:
      a low dielectric layer serving as a substrate;
      a first waveguide disposed on the low dielectric layer;
      a second waveguide disposed on the low dielectric layer;
      a third waveguide disposed on the low dielectric layer situated in between the first and second waveguides, said third waveguide comprising:
         a first low dielectric layer;
         an electro-optical tunable conducting oxide layer;
         a second low dielectric layer;
         a metal layer disposed on top of the second low dielectric layer;
    wherein there are $(N-1)2/2$ switches when N is odd and $N(N-2)/2$ switches when N is even, where N is the number of input ports and output ports; and
    wherein the router is configured to effect optical switching across the plurality of electro-optical switches across a certain range of light wavelength.

12. The router of claim 11, wherein the plurality of electro-optical switches are intrinsically in an "OFF" state.

13. The router of claim 11, wherein plurality of electro-optical switches operate at a wavelength bandwidth above 100 nm.

14. The router of claim 11, wherein the plurality of electro-optical switches are arranged in a cascaded 3-waveguide-based 2×2 pattern.

15. The router of claim 11, wherein each of the plurality of electro-optical switches operate at an average routing insertion loss of no greater than 2.5 dB.

* * * * *